United States Patent Office 3,003,908
Patented Oct. 10, 1961

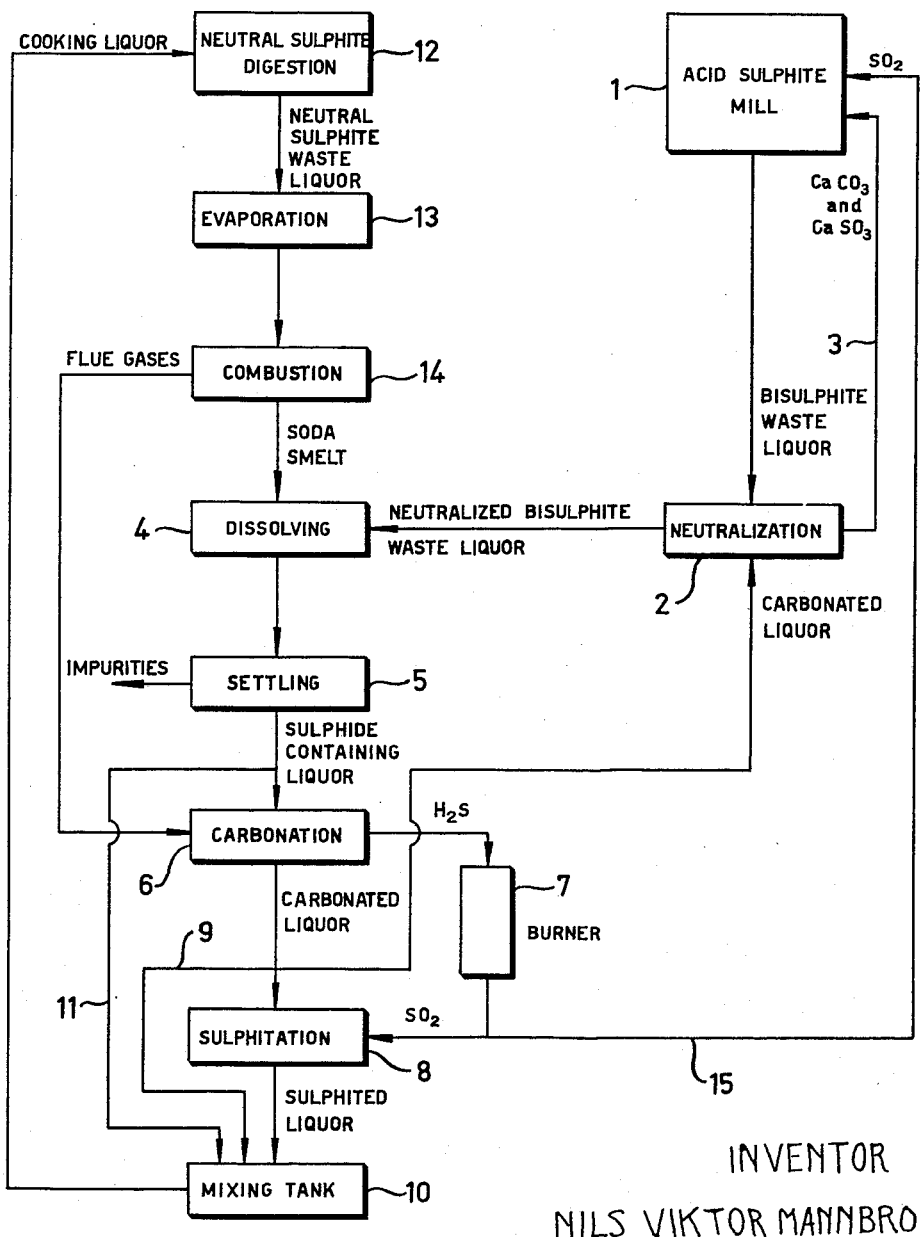

3,003,908
PROCESSES OF PREPARING COOKING LIQUOR FOR NEUTRAL SULPHITE DIGESTION OF CELLULOSIC MATERIAL
Nils Viktor Mannbro, Soderhamn, Sweden
(Apt. 15, 1115 2nd St. W., Cornwall, Ontario, Canada)
Filed Oct. 9, 1956, Ser. No. 614,911
4 Claims. (Cl. 162—33)

The present invention relates to the manufacture of cellulose from cellulosic materials, such as wood, and is more particularly concerned with a process of preparing a cooking liquor for neutral sulphite digestion of cellulosic materials.

This application is a continuation-in-part of my application Ser. No. 276,234, filed March 12, 1952, now abandoned.

Sulphite waste liquor has proved to be capable of being used for preparing cooking liquor for alkaline digestion of cellulosic materials. Thus according to a process described in the Swedish Patent No. 121,440 (U.S. Patent 2,738,270) soda smelt obtained from the regeneration of alkali in the sulphate cellulose process is added to sulphite waste liquor, the liquor is causticized with lime and is thereupon used as cooking liquor in alkaline digestion of cellulosic material, the active ingredients of this cooking liquor being sodium hydroxide and sodium sulphide. The principal advantage obtained by the procedure is that the amount of combustible matter present in the sulphite waste liquor will be burnt together with the black liquor in connection with the customary regeneration of alkali in the sulphate process and thus without any consumption of steam for evaporating the sulphite waste liquor. The sulphur content of the sulphite waste liquor will thereby for the greatest part be reduced to sulphide, which will be present in the soda smelt obtained by the combustion of the black liquor. When this soda smelt is dissolved in sulphite waste liquor the sulphide content of soda smelt solution may be driven off as hydrogen sulphide by carbonation with carbon dioxide, the hydrogen sulphide obtained being thereupon subjected to combustion to sulphur dioxide, which will be used to prepare sulphite cooking liquor.

"Neutral sulphite digestion" is the designation of those cellulose digestion processes wherein the ingredient of the cooking liquor which is active for solubilizing the wood consists of sodium sulphite ($Na_2SO_3$) which in order to control the alkalinity of the liquor (usually equivalent to a pH of about 6 to 10) is combined with for instance sodium carbonate, sodium hydroxide, sodium sulphide or sodium bicarbonate.

The cooking liquor is prepared by introducing sulphur dioxide (sulphitation) into an aqueous solution of smelt soda. The sulphitation is not allowed to continue to a degree such that sodium bisulphite is present in the liquor charged in the digesters. The liquor to be sulphited should as far as possible be free from sulphides since otherwise sodium thiosulphate ($Na_2S_2O_3$) will be formed which results in a discoloured pulp. To avoid this as far as possible it has been proposed to combine the neutral sulphite method with the soda or sulphate method by employing the soda smelt from the alkali regeneration in the latter process for preparing liquor to be used in the neutral sulphite process. Nowadays, however, this problem of maintaining a low sulphide content in the soda liquor before sulphitation may be solved by driving off hydrogen sulphide, which may be oxidized to sulphur dioxide. Thus it is possible in principle to regenerate a waste liquor derived from neutral sulphite digestion by evaporating and burning it in about the same manner as that employed to treat black liquor in a sulphate cellulose plant. The sulphur content of the neutral sulphite waste liquor gives sulphide in the soda smelt obtained after combustion of the liquor. After dissolving the smelt to form liquor it may be treated with carbon dioxide or flue gases so that sulphide is expelled in the form of hydrogen sulphide. This hydrogen sulphide may thereupon be burnt to form sulphur dioxide, which may be employed for preparing fresh liquor for the neutral sulphite digestion.

However, when preparing semi-chemical neutral sulphite pulp there is obtained a waste liquor having a content of combustible matter so low that it is not economical to regenerate it in this manner, wherefore in many cases it has been discarded, so that a fresh cooking liquid had to be prepared from freshly supplied chemicals.

The object of the present invention is a process of preparing neutral sulphite cooking liquid by dissolving or preparing the necessary chemicals in bisulphite waste liquor i.e. the spent liquor obtained from digestion of a cellulosic raw material with an acid sulphite liquor. Such waste liquor normally contains about 10 to 15% of solids, comprising organic substances dissolved from the wood in the previous digestion and inorganic sulphur and calcium or sodium compounds (depending on whether a calcium or sodium base liquor was used in the digestion), the solids normally comprising about 5 to 8% by weight of sulphur and 5 to 8% by weight of CaO (or equivalent amount of $Na_2O$), the remainder being organic substances. In other words, in this invention the water required for preparing cooking liquid for neutral sulphite digestion is supplied in the form of the aqueous content of the bisulphite waste liquor. The neutral sulphite cooking liquid prepared from bisulphite waste liquor contains at the beginning of the digestion the combustible organic substances of the bisulphite waste liquor, which enables the waste liquor obtained at the end of the digestion to be reclaimed in an economically advantageous manner. An important advantage of this invention is also that sulphur dioxide for preparing neutral sulphite cooking liquid may advantageously be prepared from the sulphide containing soda liquor obtained after combustion of the neutral sulphite waste liquor and dissolution of the soda smelt in freshly added bisulphite waste liquor, which soda liquor contains the greater part of the sulphur content of previously added sulphite waste liquor in the form of sulphide. Thus, the bisulphite waste liquor delivers sulphur to the neutral sulphite plant.

A preferred mode of operation in accordance with the present invention will now be described with reference to the appended drawing which shows a flow-sheet illustrating the process.

In the drawing, the numeral 1 designates generally an acid sulphite pulping mill, which in this example is considered as operating with calcium bisulphite liquor. From this mill waste liquor is taken and is neutralized as indicated at 2 with carbonated soda smelt liquor obtained from a subsequent step of the liquor preparation process as described below. The neutralization will be carried to about pH 7 to 8, which will require about 10% of said carbonated soda smelt liquor based on the quantity of bisulphite waste liquor. In this step the calcium content of the bisulphite waste liquor will be precipitated as calcium carbonate and calcium sulphite. This precipitate, which may amount to about 10 g. per liter of bisulphite waste liquor, may be returned to the bisulphite mill as indicated by line 3 to be utilized in the preparation of bisulphite cooking acid.

The neutralized bisulphite waste liquor is introduced in the dissolving step 4 of the neutral sulphite liquor preparation system to dissolve therein soda smelt obtained by combustion of evaporated neutral sulphite waste liquor as will be described hereinafter. Such soda smelt will comprise e.g. about 45% of $Na_2S$, 45% of $Na_2CO_3$ and 10% sodium thiosulphate, sodium sulphate etc. The amount of soda smelt dissolved in the bisulphate waste liquor will be such that the resulting solution comprises e.g. from 50 to 150 g. of $Na_2CO_3$ per liter, depending on the desired strength of the final liquor. Any solid impurities present in the resultant solution are allowed to settle, as indicated at 5. The clarified sulphide-containing soda solution is carbonated, as shown at 6, by introducing thereinto flue gases obtained from the combustion of the evaporated neutral sulphite waste liquor said flue gases being introduced in an amount such that the carbon dioxide content thereof will be somewhat in excess e.g. 120%, of the amount required to convert the sodium sulphide of the solution into sodium carbonate. In this step, hydrogen sulphide is formed, which is burnt at 7 to form sulphur dioxide, which is introduced into the carbonated liquor in the sulphitation step 8 to sulphite the liquor. The sulphur dioxide will be introduced in an amount sufficient to convert e.g. about 25% of the soda of the solution into sodium sulphite. Any excess of sulphur dioxide over that required in the sulphitation step may be passed to the bisulphite mill as shown by line 15. As stated above a portion (about one tenth) of the carbonated liquor is used to neutralize the starting bisulphite waste liquor in neutralization step 2, while another portion (e.g. about one tenth to one fifth) by-passes the sulphitation step, as indicated by line 9 and is introduced directly into a mixing tank 10 to be mixed therein with the sulphited liquor also introduced into mixing tank 10. This is done in order to adjust the proportions of sodium sulphite and sodium carbonate in the final liquor. In addition, if the quantity of bisulphite waste liquor available is in excess over that required to make up the desired amount of neutral sulphite liquor, a portion of the sulphide-containing liquor may by-pass the carbonation and sulphitation steps to be introduced into the mixing tank as indicated by line 11.

The final neutral or slightly alkaline sulphited liquor is introduced in to the digestion step, indicated generally at 12, and the resultant waste liquor is evaporated and combusted, as shown at 13 and 14, respectively. The flue gases obtained in the combustion step 14 are introduced in the carbonation step 6 as explained above while the soda smelt is dissolved in neutralized bisulphite waste liquor in step 4, as also explained above.

While the above is the presently preferred manner of carrying the invention into practice it is capable of modification in many ways. Thus, e.g., in order to reduce the sulphur losses in the combustion step 14 it is possible to wash the flue gases obtained in the combustion step 14 with the starting neutral sulphite waste liquor, with the neutralized bisulphite waste liquor or other suitable liquor taken from the process. By this measure, sulphur compounds may be recovered in such an amount that a considerable part of the amount of sulphur dioxide required in the bisulphite mill 1 may be covered.

The neutralization of the bisulphite waste liquor is only effected in order to avoid formation of sodium thiosulphate and is not a critical step in this invention, since it is also possible to dissolve the soda smelt in unneutralized bisulphite waste liquor. In the neutralization step, the sulphurous acid of the bisulphite waste liquor forms sodium sulphite, which is the desired component, wherefore the degassing of the bisulphite waste liquor need not be complete as in conventional operation, provided that the liquor is not to be subjected to fermentation after neutralization.

Instead of a calcium bisulphite waste liquor, a sodium bisulphite waste liquor may also be used, in which case no precipitation will occur in the neutralization step. Otherwise, the procedure will be substantially the same as described above.

Instead of charging the digesters with a preformed mixture of the ingredients, in the desired proportions as set forth above, it is also possible to charge the digesters with separate quantities of the various liquors, which quantities are established by an analysis of the liquors. If the total quantity of liquid added is insufficient to fill the digesters it is suitable to use an amount of the neutralized bisulphite waste liquor to compensate therefor.

After digestion, liquor recovery, evaporation, and combustion, the smelt soda is dissolved in fresh amounts of sulphite waste liquor and the above described process is repeated.

If the sulphur losses from the soda furnace are reduced by washing the flue gases with waste liquor from the digesters, neutralized sulphite waste liquor or any other suitable liquor taken from the process, sulphur dioxide may be recovered in an amount such that a considerable part of the amount of sulphur required in the sulphite plant may be covered.

When a sulphite plant is situated in the vicinity of a sulphate or sodium hydroxide cellulose plant, the manufacture of cellulose in accordance with this invention may conveniently be carried out such that the waste liquor derived from the neutral sulphite digestion is added to the black liquor or in any other manner introduced into the sulphate plant, so that the alkali regeneration may be carried out simultaneously for liquors from both of said processes.

In this case it will be possible to prepare the cooking liquor for the neutral sulphite digestion wholly or in part from soda smelt of the same composition as that used for preparing the white liquor in the sulphate plant. It is also to be observed that a sulphate plant may without any major modifications be adapted for pulp manufacture in accordance with the present invention. No equipment for causticizing the liquor is required, but on the other hand equipment for recovering hydrogen sulphide and combustion thereof to sulphur dioxide must be provided.

In experimental digestions which have been performed, the new method has been found particularly favourable for manufacturing so called semichemical pulp, i.e. pulp obtained when the digestion is not carried so far as to render the pulp defibratable in the usual manner, but the material, which is only partially solubilized, is defibrated in especially designed mills together with the waste liquor from the cook. The waste liquor is thereupon recovered from the pulp by washing upon continuous pulp filters.

When cooking in accordance with this invention to a maximum temperature of 180° C. and with an average consumption of 10% sodium sulphite based upon the wood and a neutral sulphite liquor of pH 8.2–8.6 before the cook and 7.1–7.3 after the cook pulps of the following characteristics are obtained:

| Wood | Birch | Pine |
| --- | --- | --- |
| Yield, percent of wood [1] | 72.0 | 68.9 |
| Testing results for unbeaten pulps only defibrated in waste liquor: | | |
| °S-R | 18.0 | 14.5 |
| Burst factor | 37 | 49 |
| Tensile strength, meters | 5,800 | 7,200 |
| Tear strength (B–I), g. cm./cm | 230 | 220 |
| Pulps beaten to 45° S-R in water in Lampen mill: | | |
| Number of revolutions to 45° S-R | 11,500 | 9,700 |
| Burst factor | 59 | 72 |
| Tensile strength, meters | 8,800 | 9,700 |
| Tear strength (B–I), g. cm./cm | 190 | 180 |

[1] In sulphate cellulose digestion the yield is normally about 45%.

The new pulps prepared by the process of this invention are thus of high quality and on account of their particularly good strength properties in unbeaten state very suitable for manufacturing such papers products which require only slightly beaten pulps. This applies to for instance kraft paperboard, so called kraft liner, for which use both the proper defibration and the beating in so far as such is required, may suitably take place in hot neutral sulphite waste liquor.

I claim:

1. In a neutral sulfite digestion process for producing semi-chemical pulp from cellulosic material with a neutral sulfite cooking liquor consisting of a solution of neutral sulfite cooking solids, said solution containing sodium monosulfite as the active cooking agent and having a pH of about 6–10, which process normally results in a waste liquor having a content of dissolved combustible solids insufficient to permit an economical regeneration thereof, the improvement of increasing the content of combustible solids in said waste liquor to permit regeneration thereof by evaporation and combustion and simultaneously fortifying the cooking liquor with active cooking agent which comprises preparing the said cooking liquor from a solution in bisulfite waste liquor of said neutral cooking liquor solids, said bisulfite waste liquor supplying to said cooking liquor both combustible solids for combustion during regeneration and sulfite compounds which directly at said pH form sodium monosulfite, digesting said cellulosic material in the cooking liquor and regenerating the waste liquor from said digestion by evaporation and combustion, said bisulfite waste liquor being obtained from the independent bisulfite digestion of additional cellulosic material.

2. In the process of claim 1, wherein the product of said regeneration is soda smelt containing sodium carbonate and sodium sulfide, the improvement comprising dissolving said soda smelt as the neutral sulfite cooking solids in the bisulfite waste liquor, treating the solution with carbon dioxide to convert the sulfide therein to sodium carbonate and yield hydrogen sulfide, recovering said hydrogen sulfide and burning the same to form sulfur dioxide, and introducing the sulfur dioxide into the treated solution of smelt in bisulfite waste liquor to convert a portion of the sodium carbonate therein to sodium monosulfite.

3. The process of claim 2, according to which the bisulfite waste liquor prior to the addition of soda smelt is neutralized with a part of said carbon dioxide treated soda smelt solution.

4. The process of claim 2, in which the pH of the sodium monosulfite and carbonate containing liquor is adjusted by an addition of carbonated soda smelt solution.

References Cited in the file of this patent

UNITED STATES PATENTS

| | | |
|---|---|---|
| 1,937,944 | Butler | Dec. 5, 1933 |
| 2,734,037 | Mannbro | Feb. 7, 1956 |
| 2,738,270 | Nelson et al. | Mar. 13, 1956 |
| 2,772,965 | Gray et al. | Dec. 4, 1956 |
| 2,824,071 | Gray | Feb. 18, 1958 |

OTHER REFERENCES

Sodium Base Sulfite Recovery as Related to the Semi-chemical Process, January 1956, article by T. T. Collins, Jr., et al., Southern Pulp and Paper Manufacturer (Journal), Atlanta, Georgia, 12 page article.